United States Patent Office 3,654,103
Patented Apr. 4, 1972

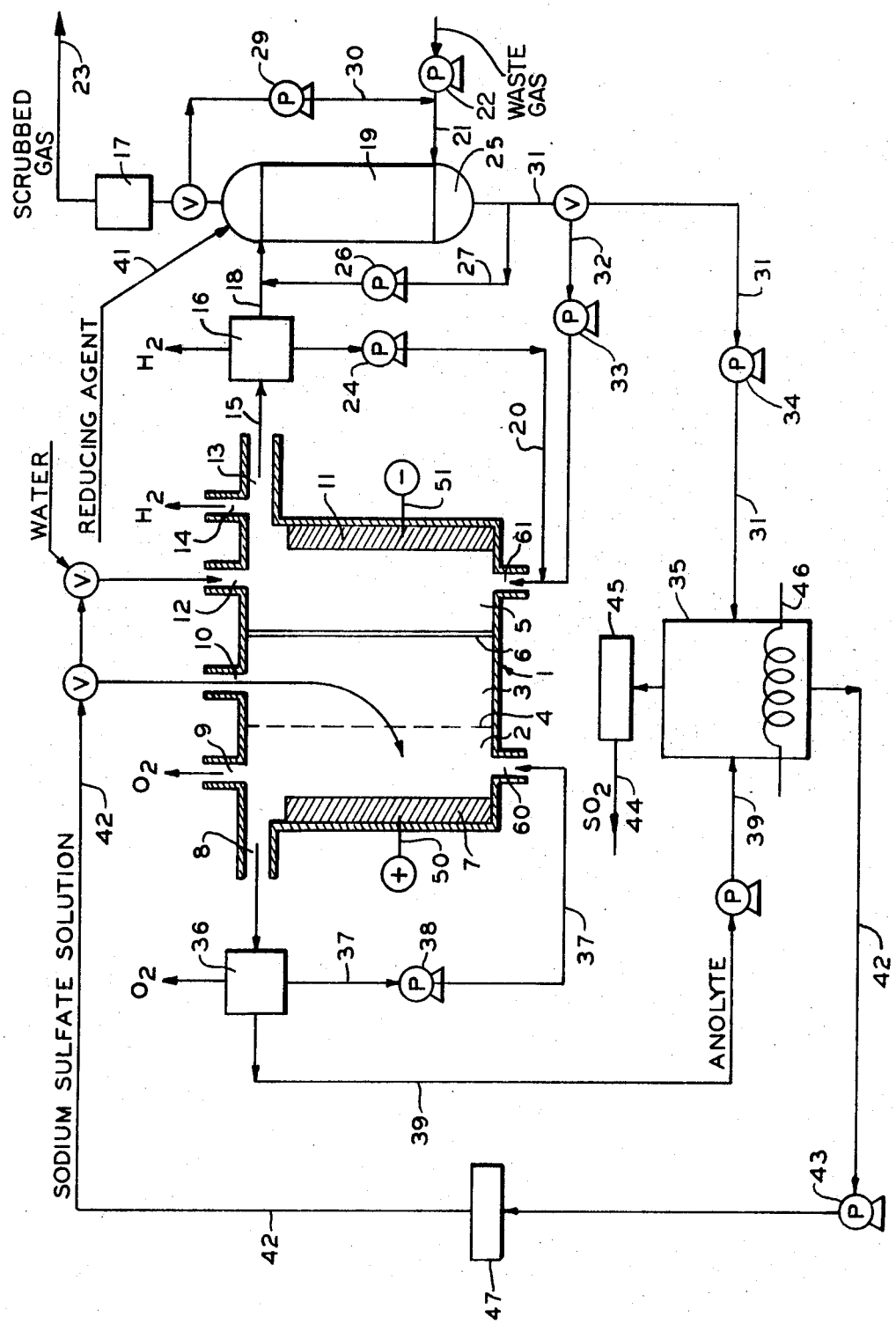

3,654,103
PROCESSES FOR CONTROLLING THE pH OF A SULFUR DIOXIDE SCRUBBING SYSTEM
Wayne A. McRae, Lexington, Mass., assignor to Ionics, Incorporated, Watertown, Mass.
Continuation-in-part of application Ser. No. 717,766, Apr. 1, 1968, now Patent No. 3,523,755. This application Aug. 3, 1970, Ser. No. 60,348
Int. Cl. B01k $1/00$; C01d $7/34$
U.S. Cl. 204—92
10 Claims

ABSTRACT OF THE DISCLOSURE

This invention is directed to a continuous cyclic process for the absorption of sulfur dioxide and/or nitrogen oxides (capable of oxidizing bisulfite) into solution from a gas containing minor amounts of nitrogen oxides, sulfur dioxide with or without oxygen and/or other oxidants with subsequent recovery of a concentrated sulfur dioxide gas stream. Electrolytically produced reducing agents such as sodium dithionite are added to the absorbing solution to absorb nitrogen oxides, to control the pH of the system and also to prevent loss of recoverable sulfur dioxide from the undesired oxidation of said sulfur dioxide which oxidation otherwise generally occurs within the absorber. Suitable reducing agents are those which will preferentially react with and remove dissolved oxidants present in the solution thereby forming bisulfite. The reducing agent consumed may be reformed by electrolytically reducing bisulfite and/or sulfur dioxide in the cathode compartment of an electrolytic cell with the resulting reformed reducing agent recycled for additional oxidant removal. The pH of the system is controlled by adding lime and soda ash equivalent to the amount of sulfur dioxide oxidized or by crystallizing sulfate salts out of part of the anolyte bisulfate effluent from the electrolytic cells, thereby removing and recovering sulfuric acid from the system.

---

This application is a continuation-in-part of co-pending Ser. No. 717,766 now U.S. Pat. No. 3,523,755 filed Apr. 1, 1968 in the name of Wayne A. McRae.

This invention relates to apparatus and processes for the removal of an acidic gas such as nitric oxide, nitrogen dioxide, nitrogen tetroxide and sulfur dioxide from a gaseous mixture.

In particular it concerns controlling the pH of aqueous solutions employed in an electrolytic scrubbing system to prevent excessive acid build-up therein.

Specifically it relates to the use of easily oxidized agents for the purpose of removing nitrogen oxides and/or other oxidants from the scrubber system thereby reducing or preventing the oxidation of sulfur dioxide.

Further it also relates to the removal of excess acidity as sulfuric acid through a crystallization-evaporation process and/or treatment with lime and a carbonate salt.

In U.S. Pat. No. 3,475,122 there is disclosed inter alia, three compartment electrolytic salt conversion cells which are employed for removing sulfur dioxide from a gas containing minor amounts of sulfur dioxide with subsequent recovery of the valuabe sulfur dioxide for eventual conversion into sulfuric acid and/or sulfur.

The main components of such three compartment electrolytic cells are arranged in the order of an anode, an anode compartment, a porous diaphragm, a center compartment, a cation-transfer membrane (alternatively a second porous diaphragm) a cathode compartment and a cathode. Liquid flow directing spacers provide the compartments and also provide the required gasketing and separation of the components. A hydraulically non-porous cation-transfer membrane is preferably used so that the liquid flowing through the cathode compartment can be independently controlled. The non-porous cation membrane prevents physical mixing of the catholyte and center compartment stream, making it easy to control the concentration of caustic generated in the catholyte. Essentially only base forming cations (and electroosmotic water) from the center compartment pass through the cation membrane to balance the hydroxide ions produced at the cathode. Except for a small air bleed stream, the center compartment feed stream leaves the center compartment only by passing through the porous diaphragm into the adjacent anode compartment. This constant hydraulic flow through the diaphragm aids in preventing the hydrogen ions produced at the anode from competing with the base cations migrating across the cation-transfer membrane into the cathode compartment. The salt feed stream which enters the center compartment must leave the cell from the anode compartment along with any acid or acid salt produced by the anodic reaction.

The invention disclosed in U.S. Pat. No. 3,475,122 is a continuous, cyclic, liquid-phase, absorption process comprised of four basic steps. The first step employs the above described basic three compartment electrolytic cell (or multicompartment cell apparatus) for converting a center compartment feed solution of a sulfate salt into an alkaline catholyte solution and sulfuric acid and/or acid sulfate salt solution. The second step involves the use of a contactor for removal of sulfur dioxide from a gas stream mixture by absorption of sulfur dioxide into the alkaline catholyte solution to form predominantly a bisulfite solution. The third step is directed to neutralizing this bisulfite laden solution with the acidic effluent anolyte solution to reform the original sulfate salt and desorb sulfur dioxide. The desorbed sulfur dioxide gas resulting from the neutralization is stripped off and recovered as a concentrated gas stream. In the fourth step the reformed sulfate salt is recycled as feed solution to the electrolytic cells where it is once again converted into acidic and alkaline components.

Since equivalent amounts of acidic and alkaline materials are inherently generated at the electrodes of the electrolytic cells there is (under ideal conditions) no necessity for adding or removing chemicals from the overall systems except, of course, the sulfur dioxide if any, which may be fed into the system as a minor component of a waste gas mixture and recovered from the system as a more concentrated sulfur dioxide stream. In practice it has been found that the total quantity of sulfur dioxide absorbed by the system from the waste gas is generally greater than the total amount of concentrated sulfur dioxide gas which is subsequently stripped and recovered from the overall system. This difference or loss of recoverable sulfur dioxide gas is due to its oxidation into sulfuric acid, bisulfate and/or sulfate by oxidants such as nitric oxide and nitrogen dioxide in the waste gas mixture or from other sources thereby removing such oxidants at least in part. For example, 97% of the total sulfur dioxide absorbed into the system may be recovered from the stripper as concentrated sulfur dioxide gas with the other 3% being oxidized to the acid salt (e.g. $NaHSO_4$) which remains in the system thereby upsetting the stoichiometric acid-base balance. Oxidation is possible whenever residual oxygen or other oxidizing agents such as nitrogen oxides, ozone, hydrogen peroxide or persulfates are available and in contact with or dissolved in the sulfur dioxide containing gas or liquid phases particularly in the presence of catalytic materials. The major source of oxidant entering the system generally comes into the contactor as a component of the sulfur dioxide containing waste gases. It is believed that variable valence metal ions such as V, Fe, Co, Cu, Mn, etc. which may enter the system from various sources, for example, as corrosion products or in fly-ash, can act to catalyze the oxidation reaction.

The oxidation of the sufur dioxide, for example, into bisulfate by whatever means will build up excess acid in the overall system so that the reformed sulfate salt solution resulting from the neutralization step will have an acid pH. This excess acid upsets the stoichiometric acid-base balance and must be avoided, removed from the system or alternatively neutralized by the addition of an outside source of alkali.

It is therefore an object of the present invention to provide an improved cyclic electrolytic process for the absorption of acidic gases whereby the sulfate feed solution to the electrolytic cell is maintained essentially neutral by preventing the build-up of excess acid within the system.

Another object is to provide a process for the preferential reduction of oxidants such as nitrogen oxides in the absorption system to prevent or reduce the amount of acid produced from the oxidation of sulfur dioxide or bisulfite.

Another object is to control the amount of residual oxidants in such a scrubber system by contacting said oxidants with materials or agents which are more easily oxidized than sulfur dioxide or bisulfite.

Another object is to recover substantially all the absorbed sulfur dioxide as a concentrated sulfur dioxide gas stream.

A further object is to provide a process to allow controlled electrolytic reduction of the sulfur dioxide or the bisulfite of a laden scrubbing solution into a reducing agent for reuse of the same as an oxidant scavenger.

Various other objects and advantages will be apparent to one skilled in the art upon reading the following disclosure and the novel features will be particularly pointed out hereinafter in connection with the appended claims. It is understood that the details may be modified without departure from the principles of the invention which is readily understood when taken in connection with the accompanying drawing. For the purposes of simplicity the various valves, flowmeters, pressure gauges, pumps, switches, etc. which one skilled in the art might employ are not all fully illustrated in the drawing which is a diagrammatic representation of a simple absorption and regeneration system.

In general the present invention comprises a continuous self-regenerating liquid-phase nitrogen oxide and/or sulfur dioxide absorption system employing a novel combination of four basic steps for controlled gas purification and for the recovery of a concentrated stream of sulfur dioxide from the system. The first step of a preferred embodiment involves the electrolytic conversion of ammonium, magnesium or alkali metal sulfate and bisulfate salts into their corresponding anolyte and catholyte products in a multiple cell electrolytic plant. The second step involves the absorption in a contactor of nitrogen oxides and/or sulfur dioxide from a gas stream (comprising sulfur dioxide and/ or at least one nitrogen oxide component for example, nitric oxide, nitrogen dioxide or nitrogen tetroxide which is capable of oxidizing sulfur dioxide) into the catholyte solution produced by the electrolytic cell; the said catholyte absorbing solution having dissolved therein a reducing agent. The reducing agent will preferentially react with those components dissolved in such catholyte solution (which components are capable of oxidizing sulfur dioxide) to prevent or inhibit said oxidation thereof. The third step is directed to passing at least a portion of the laden catholyte (predominantly a bisulfite solution and/or the sulfur dioxide therefrom) to the cathode compartment of at least some of the electrolytic cells to electrolytically reduce bisulfite and/or sulfur dioxide to reform the reducing agent. The remaining bisulfite laden alkali, if any, from the contactor is neutralized with substantially the stoichiometric amount of the acidic anolyte product of the cells to reform the original sulfate salt and recover the stripped sulfur dioxide as a concentrated stream at least part of which may be recycled to the cathode compartments. In the fourth step, bisulfite salts and the resulting reformed sulfate are recycled (with or without concentration or dilution) as feed solution to the electrolytic cells for conversion once again to the respective catholyte and anolyte solutions. Alternatively all of the laden scrubbing solution is neutralized with substantially the stoichiometric amount of acidic anolyte product of the cells to form the original sulfate salt and to recover the sulfur dioxide. In this case part of the sulfate salt and sulfur dioxide are passed to the cathode compartment of at least some electrolytic cells to electrolytically reform the reducing agent.

The present invention as disclosed herein inhibits or prevents the undesired sulfur dioxide oxidation process by employing reducing agents which are preferentially oxidized in place of the sulfur dioxide. Reducing agents such as sodium trithionate, sodium tetrathionate, sodium pentathionate, sodium hexathionate, sodium thiosulfate ($Na_2S_2O_3$), sodium dithionite ($Na_2S_2O_4$) and the like are preferably dissolved in the alkaline absorbing liquid.

The catholyte absorbing liquid of the scrubber system is generally recirculated through one or more stages of a contactor which allows substantial contact time between the absorbent and the nitrogen oxide and/or sulfur dioxide containing gas stream. Thus there is ample time for nitrogen oxides and/or other oxidizing agents which are dissolved in the absorbent liquid to react with and oxidize directly or indirectly the absorbed sulfur dioxide and ample time for additional oxidant coming in with the gas stream to be dissolved into the liquid. To prevent this undesired oxidation of sulfur dioxide, the reducing agent may be added to the liquid feed to the contactor or to the recirculating absorbent stream, such agent being oxidized preferentially compared to sulfur dioxide or bisulfite. Where thiosulfate is the reducing agent the preferential oxidation is believed to take place according to the following reaction:

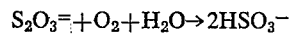
$$S_2O_3^= + O_2 + H_2O \rightarrow 2HSO_3^-$$

Where dithionite is the reducing agent which is dissolved in the absorbing solution the oxidizing reaction which may occur in the presence of sufficient reducing agent is probably the following:

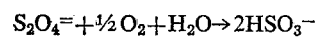
$$S_2O_4^= + \tfrac{1}{2}O_2 + H_2O \rightarrow 2HSO_3^-$$

In the use of such reducing agents the quantity of bisulfite formed may be electrolytically (cathodically) reduced and reformed into a reducing agent more susceptible to oxidation than bisulfite. This may be accomplished by bleeding at least a portion of the effluent from the absorber with or without additional sulfur dioxide and passing the same into the cathode compartment of some of the electrolytic cells wherein reduction occurs, maintaining the pH of such cells less than about 8 for example by recycling at least a portion of the anolyte effluent to the catholyte or preferably by recycling sulfur dioxide. The reducing agents formed thereby have not been unequivocally identified but without restricting the invention thereto, it is proposed that it may be substantially a dithionite salt formed according to the net reaction:

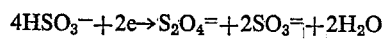
$$4HSO_3^- + 2e \rightarrow S_2O_4^= + 2SO_3^= + 2H_2O$$

Under the conditions existing in the cathode compartment some of the dithionite may disproportionate into thiosulfate and bisulfite as follows:

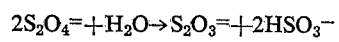
$$2S_2O_4^= + H_2O \rightarrow S_2O_3^= + 2HSO_3^-$$

Such resulting dithionite salts and thiosulfate and/or other cathodically formed reducing agents are carried over with the catholyte solution into the contactor or absorber for reuse in the control of oxidants. The sulfite formed is available for sulfur dioxide absorption as shown by the reaction:

$$2SO_3^= + 2H_2O + 2SO_2 \rightarrow 4HSO_3^-$$

The process for carrying out the invention will be described by way of example by reference to the apparatus shown schematically in the drawing and in particular to the employment of a sodium sulfate salt as the feed solution to the electrolytic cell and the use of hydrosulfite as the reducing agent it being understood that as used herein "hydrosulfite" is intended to mean the reducing agent other than elemental hydrogen, formed by the electrolysis of a bisulfite and/or sulfur dioxide containing solution at a cathode at a pH less than about 8. In the practice of the invention, a substantially neutral feed solution of sodium sulfate is passed from line 42 by pump 43 to the electrolytic cell 1 and by means of a source of direct current impressed across the cell through leads 50 and 51 (source not shown) the sulfate feed material is split to result in the formation of primarily an acid sulfate solution and hydroxide solution. The electrolytic cells may be of the type having three compartments, wherein the partition between the anode compartment 2 and the center feed compartment 3 is a diaphragm 4 of controlled porosity. If the cell is dedicated to the production of hydrosulfite this partition may be omitted, that is a two compartment cell may be used. Between the cathode compartment 5 and the center feed compartment 3 there is preferably a cation permselective membrane 6 which prevents bulk mixing of the center and cathode compartment solutions. If desired, the cation permselective membrane can be replaced with a second controlled porosity diaphragm. The non-permselective diaphragm 4 is of a design which will allow passage of bulk electrolyte solution therethrough being preferably of such suitable acid-resistant microporous materials as, for example, rubber, ceramic, polyethylene, polypropylene, Teflon (T.M.) and other synthetic fabrics.

The cation permselective membrane is in the form of a thin sheet, substantially hydraulically impermeable to water and to ions carrying a negative charge but permeable to ions carrying a positive charge. The art contains many examples of cation exchange materials which can be formed into cation permselective membranes.

The anode compartment 2 is provided with an acid resistant anode 7 (for example, lead, lead alloys of silver, antimony, tellurium and/or thallium, Chilex (T.M.), a tungsten bronze, platinum or platinum-coated electrolytic valve metals), which may be in the form of a sheet but is preferably perforated, expanded or in the form of a woven screen or closely spaced wires or rods, an outlet 8 for the anolyte liquid effluent product, outlet 9 for any gaseous anodic products which may form such as oxygen and inlet 60 for passage of recycled anolyte therein. The center feed compartment contains an inlet 10 through which the electrolyte feed solution is introduced.

The cathode compartment 5, defined from the center compartment 3 by the cation membrane 6, is provided with a cathode 11 such as copper, lead or lead alloy, nickel, iron or steel, which may be in the form of a sheet but is preferably in the form of an expanded sheet, woven screen or closely spaced wires, and inlet 12 through which electrolyte is passed, and inlet 61 for recycling cathode compartment effluent back into the cathode compartment along with or without sulfur dioxide and/or a portion of the bisulfite laden stream removed from the effluent stream 31 of the absorber 19. Outlet 13 of the compartment serves to withdraw the catholyte product, and outlet 14 removes gaseous cathodic products such as hydrogen. The diaphragm, membrane and electrode components may be separated from each other by thin, gasketed spacers (not shown) which form the fluid-containing compartments of the cell.

In operation, a sulfate solution (for example, sodium sulfate, potassium sulfate, ammonium sulfate or magnesium sulfate) is introduced by pressure means (such as a pump) into the center compartment through inlet 10, at a rate and pressure which in its passage through the optional porous diaphragm 4, if any (as shown by the arrow) is sufficient substantially to inhibit fast-moving hydrogen ions formed at the anode from migrating to the cathode in competition with the passage of other cations into said cathode compartment from the center compartment. Simultaneously, electrolyte containing sulfur dioxide and/or bisulfite is introduced into the cathode compartment via inlet 12. Under the influence of an impressed direct electric current, cations of the electrolytic solution in the center compartment pass through the cation permselective membrane 6 into the cathode compartment. Bisulfite and/or sulfur dioxide are reduced to hydrosulfite at the cathode. This catholyte product is withdrawn through outlet 13 in a concentration dependent generally upon the current employed and the rate of liquid flow into the cathode compartment. The catholyte product bleed rate and recycle of anolyte product bleed any/or sulfur dioxide to the catholyte are jointly adjusted to maintain a catholyte effluent pH of less than about 8.

The sulfate solution in the center compartment 3 having been partially depleted of its positive ions, passes through the optional porous diaphragm, if any, into the anode compartment where combination of the anionic sulfate groups and the anodically produced hydrogen ions forms an anolyte solution of the acid salt for example sodium bisulfate. This anolyte is withdrawn from the cell through outlet 8 and passed into the acid-holdup/gas-liquid separation tank 36. The anolyte may be recycled back to the anode compartment through recirculation loop 37 by a pump 38. Part of the anolyte may be used to control the pH of the cathode compartment. A stream of anolyte solution is bled and removed from the acid holdup tank 36 and passed through line 39 into the neutralizer-stripper tank 35. Within this tank the excess laden solution, if any, from the absorber gas-liquid contactor 19 entering from line 31 will be neutralized substantially stoichiometrically by the acidic anolyte solution to form the original sulfate feed solution. The resulting regenerated sulfate solution, if any, is removed from the neutralizer-stripper tank 35 by line 42 and passed by pumping means 43 as feed back to the cell for example, as an essentially neutral solution. During the neutralization reaction the sulfur dioxide is desorbed and recovered from tank 35 at exit line 44 as a substantially concentrated gas stream after first passing through a moisture-gas separator apparatus 45. Part of the sulfur dioxide may be used as feed to the cathode compartment. The removal of the sulfur dioxide from the regenerated sulfate solution can be accelerated by use of a boiler or heater 46 to reboil and strip away the evolved sulfur dioxide gas. Other stripping means such as steam, vacuum, air or the like may also be employed in ways well known in the art. The regenerated sulfate solution is preferably passed through a filter 47 or other particle removing means before being returned as the feed solution to the electrolytic cell in order to minimize blinding of the porous diaphragm of the cell.

The effluent from the cathode compartment 5 is passed via line 15 into the catholyte-holdup/gas-liquid separation tank 16, subsequently withdrawn through line 18 and introduced into the top of an absorber or gas-liquid contactor apparatus 19 and/or recycled through pump 24 back to the cathode compartment by way of recycle loop 20. The absorber 19 may be of conventional design such as a counter-current packed or spray chamber. Simultaneously, a gas stream containing nitrogen oxides with or without sulfur dioxide is introduced into the bottom of the tower through inlet gas line 21 by means of a gas blower 22 or other momentum producing means. The absorber is preferably operated counter-currently so as to allow contacting the gas having the least amount of nitrogen oxides with the most avid absorbing liquid. The descending liquid will absorb oxidizing substances such as nitrogen dioxide and then collect in the bottom of the absorber at 25. The absorber can be designed so that the scrubbing solution makes a single pass. To improve the performance of the scrubbing action the solution can be continuously recirculated therethrough by pumping means 26, a portion of the liquid being removed from the bottom of the absorber and returned to inlet line 18 by means of return or recycle conduit 27. This recirculation provides continuous and thorough contact with the gas stream. It is during this absorption step and primarily within the absorber where a substantial portion of the previously described oxidation of sulfur dioxide will occur unless preventive steps are employed. To this end the reducing agent effluent from the cathode compartment is introduced into the absorber at any convenient point such as via inlet feed line 41 where the agent mixes with or otherwise intimately contacts the scrubbing solution. If preferred the reducing agent may be injected into the recycle conduit 27 or added directly into the absorber sump. The reducing agent is maintained in substantial excess over the nitrogen oxides throughout the absorber and preferably not more than 90% of the reducing agent is allowed to oxidize in the absorber. It is found that if the reducing agent is not maintained in substantial excess of the nitrogen oxides throughout the absorber or if more than about 90% of the reducing agent is allowed to oxidize in the absorber, then a substantial fraction of the sulfur dioxide, bisulfite, sulfite and/or hydrosulfite will be irreversibly oxidized to sulfuric acid, sulfate and/or bisulfate.

After passing upwardly through the absorber, the gas, substantially depleted of nitrogen oxides and/or sulfur dioxide is removed from the system at exit line 23 optionally after first passing through a liquid-gas separator 17 to remove entrained liquid droplets from the gas. Where a single pass of the laden gas is not sufficient to remove the desired percentage of nitrogen oxides and/or sulfur dioxide part of the gas may be recycled by a pump 29 back to the bottom of the tower for further scrubbing by way of return conduit 30. Preferably, at least 80% nitrogen oxide and/or sulfur dioxide removal should be accomplished.

The laden solution comprising mostly bisulfite and unoxidized reducing agent is continuously bled from the absorber by outlet line 31. At least a portion of the laden solution is removed from outlet line 31 via line 32 and introduced directly into the cathode compartment of at least some of the electrolytic cells by pumping means 33 where it mixes with the solution being recycled through line 20. The remaining portion of the laden solution bled from the absorber via line 31 is passed by pump 34 directly into the neutralizer-stripper tank 35 where it mixes with the incoming acidic anolyte effluent solution from line 39.

Fresh catholyte from the electrolytic cell is continuously passed into the absorber to make up for the laden solution removed through line 31. It is preferred that the solution leaving the absorber be largely converted to bisulfite through the oxidation of hydrosulfite and/or absorption of sulfur dioxide in accordance with the following reactions:

(a) $S_2O_4^= + NO + H_2O \rightarrow 2HSO_3^- + \frac{1}{2}N_2$ (b) $2S_2O_4^= + NO_2 + 2H_2O \rightarrow 4HSO_3^- + \frac{1}{2}N_2$ (c) $OH^- + SO_2 \rightarrow HSO_3^-$ (d) $SO_3^= + SO_2 + H_2O \rightarrow 2HSO_3^-$ As previously stated at least a portion of the laden absorber effluent primarily in the form of bisulfite with or without additional free sulfur dioxide is bled from line 31 and passed into the cathode compartment of the electrolytic cell. The bisulfite contained in this laden solution may be formed from the absorption and reaction of sulfur dioxide with alkali or sulfite. However, the oxidation of the dithionite (and/or thiosulfate and/or other reduction products of bisulfite as the base may be) in its reaction with dissolved residual oxidant also will contribute to bisulfite formation. Within the cathode compartment the electrolytic reduction of bisulfite to dithionite and/or other reduction products of bisulfite will rapidly occur on contact with the cathode by way of illustration as follows:

(a) $2SO_2 + 2e \rightarrow S_2O_4^=$ (b) $4HSO_3^- + 2e \rightarrow S_2O_4^= + 2SO_3^= + 2H_2O$ It being understood that the cathodically produced reducing agent may also contain thiosulfate, trithionate, tetrathionate, pentathionate, hexathionate and other unidentified reducing agents. The cathode reduction will result in the regeneration of the reducing agent with or without the formation of available alkali in the form of sulfite. This resulting catholyte mixture may be recycled through the cathode compartment by way of recycle conduit 20 until the desired reduction is accomplished so that at steady state the catholyte bleed stream 18 passing into the absorber will contain sufficient reformed reducing agent to react with and remove those oxidizing agents which may dissolve in the absorbing liquid. It is preferred to provide a sufficient excess of reducing agent to control any additional oxidizing agents which may be introduced into the neutralizer-stripper along with the acidic anolyte and to avoid the undesired oxidation of bisulfite to bisulfate. Where the cathode reaction generates an ample quantity of reducing agent, the system will be sulf-sustaining and not require injecting additional reducing agent from a source outside the cyclic stream.

It will be undertood that for practical and commercial applications a multiplicity of two and/or three compartment cells will be required to form the electrolytic conversion apparatus. Bipolar common (bilateral) electrodes may be used advantageously in the multicell apparatus in place of single (unilateral) electrodes where the preferably composite materials of electrode construction can withstand both anodic and cathodic attack. In common electrodes both sides of the electrode are taking part in the electrolytic process in contrast to single electrodes in which only a single side is actively involved. A preferred apparatus comprises a plurality of repeating cells placed adjacent to each other in a supporting structure wherein each electrode is placed common to two individual cells or units with the bilateral monopolar cathode and anodes arranged throughout the stack in an alternating fashion. A particularly advantageous multicell electrolytic apparatus is that described in U.S. Pat. No. 3,475,122 utilizing bimetallic, bipolar electrodes placed common to two individual cells. A preferred electrode of the bimetallic type is one having a cathode surface on one side constructed of iron and the other side of an alloy containing approximately 88% lead, 10% silver and 2% tellurium.

The following equations appear to cover the various reactions which may be occurring within a typical scrubber system processing a typical stack gas from a fossil fueled steam turbine generator electric power plant:

(1) ELECTROLYTIC CELL (a) Anode compartments

Principal reaction: $4SO_4^= + 2H_2O \rightarrow 4HSO_4^- + O_2\uparrow + 4e$
(Trace reaction: $xS_2O_4^= + 4xH_2O \rightarrow 2xHSO_4^- + 6xH^+ + 6xe$)

(b) Cathode compartments

Some compartments: $3.6H_2O + 3.6e \rightarrow 3.6OH^- + 1.8H_2$
Remaining compartments: $0.8HSO_3^- + 0.4e \rightarrow 0.2S_2O_4^= + 0.4SO_3^= + 0.4H_2O$

(2) ABSORPTION TOWER (a) $SO_2$ absorption $$4.0SO_2 + 3.6OH^- + 0.4SO_3^= + 0.4H_2O \rightarrow 4.4HSO_3^-$$

(b) $NO_x$ absorption $$0.2NO + 0.2S_2O_4^= + 0.2H_2O \rightarrow 0.4HSO_3^- + 0.1N_2$$

(3) NEUTRALIZER-STRIPPER TOWER $$4.0HSO_3^- + 4HSO_4^- \rightarrow 4H_2O + 4SO_4^= + 4SO_2\uparrow$$

(4) OVERALL SYSTEM $$4SO_4^= + 6.2H_2O + 4.0SO_2 + 0.2NO \rightarrow 4.0SO_4^= = 4.4H_2O$$
$$+ 0.1N_2 + 4.0SO_2 + 1.8H_2\uparrow + O_2\uparrow$$

(5) NET CONVERSION $$1.8H_2 + 0.2NO \rightarrow 0.1N_2\uparrow + 1.8H_2\uparrow + O_2\uparrow$$

In the case of a stack gas containing substantially no sulfur dioxide but containing undesirable amounts of nitrogen oxides capable of oxidizing bisulfite (for example, tail gases from the manufacture of nitric acid by oxidation of ammonia or fumes from the pickling of metal with concentrated nitric acid) the various reactions which may be occurring within a typical scrubber system processing a typical stack gas may be as follows:

(1) ELECTROLYTIC CELL (a) Anode compartments

Controlled current compartments: $4SO_4^= + 2H_2O \rightarrow 4HSO_4^- + O_2\uparrow + 4e$ Controlled potential compartments: $0.25S_2O_3^= + 4.5HSO_3^- + 4SO_4^= + e + 4SO_4^= SO_2\uparrow + 4HSO_3^-$ (b) Cathode Compartments $$4SO_4^= + 5SO_2 + 5e \rightarrow 4SO_4^= + 2.5S_2O_4^=$$

(2) ABSORPTION TOWER $$4SO_4^= + NO_2 + 2.5S_2O_4^= + 2H_2O \rightarrow 4SO_4^= + 4HSO_3^- + 0.5N_2\uparrow + 0.5S_2O_4^=$$
$$0.5S_2O_4^= + 0.25H_2O \rightarrow 0.25S_2O_3^= + 0.5HSO_3^-$$

(3) NEUTRALIZER-STRIPPER $$4HSO_3^- + 4HSO_4^- \rightarrow 4SO_4^= + 4SO_2\uparrow + 4H_2O$$

(4) OVERALL REACTION $$8SO_4^= + 2H_2O + NO_2 \rightarrow 8SO_4^= + 0.5N_2\uparrow + 2H_2O + O_2$$

(5) NET CONVERSION $$NO_2 \rightarrow 0.5N_2\uparrow + O_2\uparrow$$

The reactions in the absorption tower also include:

(6) SIDE REACTIONS (a)     $NO_2 + 2HSO_3^- \rightarrow 0.5N_2\uparrow + 2HSO_4^-$
(b)     $O_2 + 2HSO_3^- \rightarrow 2HSO_4^-$
(c)     $3NO_2 + 2S_2O_4^= + 2H_2O \rightarrow 1.5N_2\uparrow + 4HSO_4^-$
(d)     $3O_2 + 2S_2O_4^= + 2H_2O \rightarrow 4HSO_4^-$ Each of these side reactions (and others) leads to the formation of bisulfate which is not readily regenerable to bisulfite or hydrosulfite and leads to a gradual build-up of acid and a decrease of pH in the system.

The oxidation of bisulfite will be inhibited by maintaining an excess of hydrosulfite in the absorption tower as shown under (2) "Absorption Tower" above. Under conditions prevailing in the tower some dithionite may be converted to thiosulfate and bisulfite. The remainder (with any thiosulfate) passes through the neutralizer-stripper where an additional amount may be converted to thiosulfate in accordance with the reaction:

$$2S_2O_4^= + H_2O \rightarrow S_2O_3^= + 2HSO_3^-$$

The remaining dithionite (and thiosulfate, if any) if not otherwise processed, will accompany the sulfate recycled to the electrolytic cell and that fraction in the feed to the anode compartments of controlled current cells will be oxidized to bisulfate in accordance with the reaction:

$$S_2O_4^= + S_2O_3^= + 9H_2O \rightarrow 4HSO_4^- + 14H^+ + 14e$$

Although the resulting bisulfate will be equivalent to only a small fraction of the hydrosulfite formed electrolytically and small in comparison with the amount of bisulfite which would have been oxidized to bisulfate in the absence of hydrosulfite, nevertheless it is preferred to oxidize the dithionite and thiosulfate in two or three compartment cells at anodes having a potential controlled in ways well known in the art to be less oxidizing than that required to oxidize bisulfite to bisulfate. Under such controlled potential electrolysis the remaining hydrosulfite (dithionite plus any thiosulfate) is oxidized to sulfur dioxide and/or bisulfite. The effluent from such controlled potential electrolysis is preferably sent to the neutralizer-stripper and/or to the cathode compartments.

Alternatively the excess hydrosulfite may be converted to bisulfite and/or sulfur dioxide by prolonged heating at low pH, i.e., under the conditions existing in the neutralizer-stripper:

$$2H^+ + 2S_2O_4^= \rightarrow S_2O_3^= + 2SO_2\uparrow + H_2O$$

$$2H^+ + S_2O_3^= \rightarrow S\downarrow + SO_2\uparrow + H_2O$$

The sulfur formed however is finely divided, difficult to filter and tends to collect in the neutralizer-stripper.

One alternate manner of controlling the pH of the liquid scrubbing system is to employ a procedure for removing the excess acid (usually present in the form of bisulfate) from the overall system. Preferably the required amount of the acidic anolyte effluent solution is made to bypass the neutralizer-stripper apparatus, if any, and is introduced into a crystallizer-evaporator apparatus to allow concentration of the acid sulfate solution. This concentration will result in the substantially complete crystallization and separation of sulfate salts from a mother liquor of sulfuric acid illustrated as follows in the case of sodium bisulfate.

$$2NaHSO_4 + 10H_2O \rightarrow Na_2SO_4 \cdot 10H_2O\downarrow + H_2SO_4$$

The mother liquor recovered will under the usual conditions existing in the crystallizer-evaporator apparatus be a weak acid of about 78% concentration. This acid which ideally represents the quantity of excess acid within the system is withdrawn from the overall scrubber system and may be sent for further concentration to an evaporator or preferably to a plant producing sulfuric acid by the oxidation of sulfur dioxide, for example, from recovered sulfur dioxide. The weak acid can be advantageously added to a higher strength acid (e.g., oleum) to combine therewith and produce a resulting acid having a concentration of at least 97%. Concentrated sulfur dioxide recovered from the stripper apparatus if any may be oxidized to sulfur trioxide (as by the contact process) and absorbed into the resulting 97% plus acid to further increase its concentration. The sulfate crystals recovered in the crystallizer-evaporator may be redissolved in water and cycled back as part of the feed solution to the electrolytic cell or sent to the neutralizer-stripper tank, if any, to combine with the sulfate salt being reformed therein.

The pH level of the various aqueous solutions within the overall scrubber system may be continuously recorded and monitored to accomplish the removal of excess acid in an amount necessary to maintain stoichiometry within the system through liquid flow control means to gauge the amount of acid which is removed or added back to the system to maintain the proper pH.

Another method of controlling the pH in the scrubber system is to employ a procedure for chemically neutralizing the excessive acidity which generally appears in the system in the form of bisulfate. As previously stated, this acidity develops from the undesired oxidation of bisulfite, hydrosulfite and/or sulfur dioxide. The bisulfate acidity ($HSO_4^-$) may be neutralized by the addition of an equivalent quantity of lime or ground limestone which is preferably added to the effluent of the neutralizer-stripper tank prior to passage of this effluent back to the electrolytic cell as a feed solution. This effluent solution will otherwise be acidic due to the excess acid sulfate which it contains and the addition of lime will result in a substantially neutral feed solution according to the following reaction:

Lime conditioning

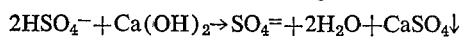
$$2HSO_4^- + Ca(OH)_2 \rightarrow SO_4^= + 2H_2O + CaSO_4\downarrow$$

The relatively insoluble $CaSO_4$ is first removed from the reformed sulfate solution before recycling the same as a feed solution to the cell. However, because $CaSO_4$ has an inverse temperature solubility characteristic the small amount of $CaSO_4$ remaining in solution can precipitate out of solution at various points within the system where there occurs an increase in temperature and/or concentration such as for example within the electrolytic cell or in the neutralizer-stripper apparatus.

To eliminate these shortcomings, effluent obtained from the liming is preferably treated with small amounts of carbonate salts e.g., of sodium, potassium, ammonium or magnesium for a combined lime-carbonate conditioning procedure so that the following reactions occur:

Lime-carbonate conditioning

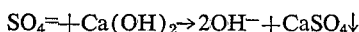
$$SO_4^= + Ca(OH)_2 \rightarrow 2OH^- + CaSO_4\downarrow$$

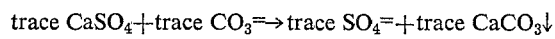
$$\text{trace } CaSO_4 + \text{trace } CO_3^= \rightarrow \text{trace } SO_4^= + \text{trace } CaCO_3\downarrow$$

The lime-carbonate treatment removes trace amounts of $CaSO_4$ which would otherwise remain in solution when lime alone is employed. The use of carbonate will allow for the removal of dissolved calcium from the system in the form of a highly insoluble precipitate of calcium carbonate resulting in a solution having substantially no available ions for later precipitation within the scrubber system. The combined lime-carbonate treatment eliminates the excess acidity in the system which would otherwise build up. The size and capacity of the electrolytic cell plant can therefore be less where the lime-carbonate process is employed.

The following examples show by further illustrations and not by way of limitation the cyclic method of absorbing sulfur dioxide and/or nitrogen oxides and the regeneration of the spent aqueous absorbent to form the original salt feed to the cell and the manner for maintaining pH control in the overall scrubber system.

EXAMPLE 1

An array of six electrolytic cells of the general type disclosed and described containing six lead-2% tellurium-1% silver anodes and six nickel cathodes is used to convert a 2 normal aqueous solution of sodium sulfate into sodium acid sulfate and sodium hydroxide respectively. The diaphragms are microporous silicone rubber and have a thickness of 0.25 millimeter and are supported on their anode sides by woven glass cloth. The void volume of the diaphragm is about 70 percent and the average pore size is about 20 microns. The interior electrodes are bimetallic and bipolar, that is, they consist of a laminate of lead alloy and nickel. The membrane is a self-supporting carboxylic type cation permselective membrane of the type described in U.S. Pat. 2,731,408, prepared from a mixture of divinyl benzene, ethyl styrene and acrylic acid. It has a thickness of 0.7 millimeter, an areal resistance of 2 ohm cm.² in 1 molar sodium hydroxide at 150° F., a water content of about 20 percent of its dry weight, a cation exchange capacity of about 6.5 milli-equivalents per dry gram of resin, average pore size of less than 0.1 micron, a transport number for sodium ions of about 0.85 when in equilibrium with 1 molar sodium hydroxide, a Mullen A burst strength of about 80 pounds per square inch and is reinforced with two layers of bonded, non-woven polypropylene mat. The spacing between the diaphragm and the membrane is filled with non-woven bonded polypropylene screen having a thickness of 2 millimeters. The outer edges of the compartments are fitted with high density polyethylene gaskets having a compressed thickness of about 2 millimeters. A 2 normal solution of sodium sulfate is introduced into the central compartments at a rate of 4 liters per hour per active square foot of anode. The current density at the anode and at the cathode is 120 amperes per square foot. The temperature of the cell is maintained at 150° F. by recirculating both the anolyte and the catholyte through heat exchangers. The voltage required is about 36 volts DC that is, about 6 volts per cell. At steady state the bleed from the anolyte is found to be essentially 1 molar sodium bisulfate indicating a current efficiency of about 90 percent. At the cathode, 4 liters of caustic per hour per square foot are removed from the recirculating catholyte stream and the volume is maintained by adding water. At steady state the catholyte bleed is found to have a concentration of about 1 equivalent per liter indicating a current efficiency of about 90 percent. The catholyte bleed is contacted counter-currently with a simulated flue gas having the following composition:

| Component: | Volume percent |
| --- | --- |
| $SO_2$ | 0.3 |
| $NO$ | 0.03 |
| $CO_2$ | 13.0 |
| $N_2$ | 74.0 |
| $O_2$ | 6.0 |
| $H_2O$ | 6.7 |

The contact is carried out in a first column packed with glass Raschig rings. The liquid and the gas flows and the height of the packing are adjusted to remove about 90 percent of the $SO_2$ and give a liquid effluent having an empirical composition corresponding to about 82 mol percent of sodium bisulfite and about 18 mol percent of sodium sulfite. It is found that about 40 percent of the NO is removed from the simulated flue gas. The liquid effluent is mixed with the corresponding amount of anolyte from the electrolytic cell and passed downwardly through a second column packed with glass Raschig rings and heated to 100° C. and against an upward stream of steam from a reboiler. The overhead vapor from the column is condensed against cold water and the condensate returned to the second column as reflux. The vapor leaving the condenser is dried with concentrated sulfuric acid and is then found to be essentially 100 percent sulfur dioxide and thus suitable for the manufacture of sulfuric acid using the contact process. The sodium sulfate leaving the bottom of the second column is diluted to about 2 equivalents of sodium per liter in a multiple effect evaporator. The condensate in the latter case is used as feed to the cathode compartments of the multiple compartment electrolytic cell. The sodium sulfate effluent is found to contain about 0.12 equivalent of sodium bisulfate per liter corresponding to the oxidation of about 7.5 percent of the absorbed sulfur dioxide. Although the sodium sulfate effluent is still suitable for feed to the central compartments of the cell thereby completing the cyclic operation, it is found that upon each such cycle the acidity increases by about 0.12 equivalent per liter and the voltage of the electrolytic cells gradually increases to about 45 volts that is about 7.5 volts per cell apparently owing to partial conversion of the carboxylic membrane to the non-conducting hydrogen form. If approximately 2 normal aqueous sodium carbonate solution is added (about 0.06 liter per cycle per liter of sulfate feed solution) to maintain the pH in range of about 6 to 9 then the voltage can be maintained at about 36 volts, that is, at about 6 volts per cell but the volume of solution increases at the rate of about 6 percent per cycle. In the process described there is both a loss of recoverable sulfur dioxide and an electrolyte disposal requirement.

EXAMPLE 2

In order to reduce the addition of carbonate (as in Example 1), the apparatus of Example 1 is operated as described therein except that part of the liquid effluent from the first column (the absorber) is recirculated through one of the cathode compartments instead of water. Additional liquid effluent from the first column is added to the recirculated catholyte at a rate adjusted to maintain the pH of the bleed from the recirculating loop at less than 8.0. This bleed has an odor resembling hydrosulfite and is mixed with the bleed of alkali from the other five cathode compartments and contacted countercurrently with the simulated flue gas in the first column described above in Example 1. It is found that during steady state operation it is necessary to pass between about ¼ and ⅓ of the effluent from the first column through the specified cathode compartment to maintain a pH less than 8.0. It is found that when about 90 percent of the sulfur dioxide in the simulated flue gas is removed in the first column that about 85 percent of its nitric oxide will also be removed that is more than twice as much as in Example 1. At steady state, the sodium sulfate effluent from the second column (neutralizer-stripper) is found to contain about 0.04 equivalent of sodium bisulfate per liter, that is only about 50 percent of that found in Example 1. It is concluded by difference that the recovery of concentrated sulfur dioxide has increased substantially, that is, from about 92.5 percent to about 97.5 percent. The acidity in the system may be controlled in the pH range of about 6 to about 9 by the addition of only about 0.02 liter of 2 normal aqueous sodium carbonate solution to each liter of sodium sulfate feed to the electrolytic cells. The voltage is maintained at about 36 volts (6 volts per cell) without noticeable trends in any direction upon repeated cycles. The volume of the feed solution increases by only about 2 percent per cycle owing to the addition of the carbonate solution. In this manner the required reducing agent for control of pH and nitrogen oxides is made by the system without appreciable increase in cost or in complexity. Although the product of the cathodic reduction of bisulfite is called "hydrosulfite" herein for convenience it is undoubtedly a mixture of cathodic reduction products of bisulfite. It has been termed "hydrosulfite" herein because its reducing properties are similar to those of the sodium hydrosulfite of commerce. This example in contrast to that of Example 1 illustrates the utility of this invention in removing nitrogen oxides from stack gas while simultaneously controlling the acidity of the sorbent solution. It is found that the removal of nitrogen oxides and the control of the oxidation of sulfur dioxide can be accomplished similarly when the feed to the central compartment of the electrolytic cells is a solution of ammonium, potassium or magnesium sulfate. In the latter case it is found to be advantageous to use arrays of vertically oriented nickel, iron or steel wires as cathodes to facilitate release of the magnesium hydroxide formed. In this manner both problems of sulfur dioxide recovery and electrolyte disposal, have been solved.

EXAMPLE 3

The apparatus of Example 2 is operated as described in that example except that about 20 percent of the feed solution by-passes the electrolytic cells and is treated with slaked lime (calcium hydroxide) to precipitate calcium sulfate. A slight excess of calcium hydroxide is used over stoichiometry. The calcium sulfate is removed by filtration or centrifugation and sufficient 2 normal sodium carbonate solution is added to give a residual soluble calcium of less than 20 milligrams per liter. The calcium carbonate is removed by filtration or centrifugation and the resulting liquor is combined with the bleed from the cathode compartments and sent to the flue gas contact column (first column). It is found that the current density may be decreased by about 4 percent as compared to Example 2 while maintaining the same performance, that is supplying 4 liters of sorbent per hour to the flue gas contact column for each square foot of cathode in the electrolytic cells. While the amount of feed which by-passes the cells is on the average about 2.0 percent, the exact quantity is varied from time to time to maintain the pH of the feed material between about 6 and 9. The sodium sulfate effluent from the second column is found to be substantially free of sodium bisulfate at steady state. The recovery of concentrated sulfur dioxide is about 97.5 percent of that absorbed. The voltage is maintained at about 36 volts (6 volts per cell) without noticeable trends in any direction upon repeated cycles. The volume of feed solution remains substantially constant. Thus the nitrogen oxide removal and electrolyte disposal problems have been solved. This method is particularly useful when the recovered sulfur dioxide has low market value.

EXAMPLE 4

The apparatus of Example 2 is operated as described in that example except that a bleed of about 4 percent of the anolyte effluent is evaporated to a concentration which will just begin to crystallize at about 0° C. (generally about 250 grams per liter) and then chilled to about −10° C. Sodium sulfate decahydrate crystallizes out and is removed by filtration or centrifugation. The process is repeated until substantially all of the sodium values have been removed and the remaining sulfuric acid has a concentration of about 78 percent. It is then further concentrated to 98 percent by methods well known in the art. Alternatively the 78 percent acid is added to a higher strength acid to produce acid having a concentration of at least 97 percent. The latter is then used to absorb sulfur trioxide produced from the sulfur dioxide evolved in the second column of Example 2 (the neutralizer-stripper column). The sodium sulfate recovered is returned with water as necessary to the feed solution to the electrolytic cells. Although the amount of anolyte which is removed from the system is on the average about 4 percent, the exact quantity is varied from time to time to maintain the pH of the feed material between about 6 and 9. The sodium sulfate effluent from the second column is found to be substantially free of sodium bisulfate at steady state. The recovery of concentrated sulfur dioxide is about 97.5 percent of that adsorbed but the overall recovery of the sulfur value is essentially 100 percent of that absorbed. The voltage is maintained at about 36 volts (6 volts per cell) without trends in any direction upon repeated cycles. The volume of feed solution remains substantially constant. Thus both the sulfur recovery and electrolyte disposal problems have been solved. This method is particularly applicable to larger sulfur dioxide control plants and may be used with the other sulfate salts.

EXAMPLE 5

Two arrays of six 3-compartment electrolytic cells each are constructed of the general type disclosed and described, the first array containing three monopolar bilateral lead-2% tellurium-1% silver anodes interposed between iron cathodes arranged to operate in hydraulic and electrical parallel. That is, the liquid flows to the center compartments and to the cathode compartments and the flows of electric current to the anodes are all in parallel. The second array contains three monopolar bilateral platinum-plated titanium anodes interposed between nickel cathodes arranged to operate in hydraulic series and electrical parallel. The system is used to demonstrate the process of this invention on a simulated sulfur dioxide free waste gas stream containing nitrogen dioxide. The steam has the following approximate composition:

| Component: | Volume percent |
|---|---|
| $NO_2$ | 0.3 |
| $N_2$ | 78.7 |
| $O_2$ | 21.0 | and is roughly representative of tail gases from the manufacture of nitric acid by the oxidation of ammonia or of vent gases from the pickling of metals with concentrated nitric acid.

The reactions which take place in the system are believed to be approximately as follows:

Cathodes $$2Na_2SO_4 + 10Na^+ + 10e + 10SO_2 \rightarrow 5Na_2S_2O_4 + 2Na_2SO_4$$

Anodes—Array 1

$$8Na_2SO_4 + 4H_2O \rightarrow 8NaHSO_4 + 2O_2 + 8e + 8Na^+$$

Anodes—Array 11

$$Na_2S_2O_4 + 8NaHSO_3 + 2Na_2SO_4 \rightarrow$$
$$2SO_2\uparrow + 8NaHSO_3 + 2Na_2SO_4 + 2Na^+ + 2e$$

Absorber $$5Na_2S_2O_4 + 2Na_2SO_4 + 4H_2O + NO_2 + O_2 \rightarrow$$
$$8NaHSO_3 + Na_2S_2O_4 + 2Na_2SO_4 + \tfrac{1}{2}N_2\uparrow$$

Neutralizer-Stripper $$8NaHSO_3 + 8NaHSO_4 \rightarrow 8Na_2SO_4 + 8SO_2\uparrow + 8H_2O$$

The membranes are self-supporting sulfonated type cation permselective membranes of the type described in U.S. Pat. No. 2,731,411 prepared from a mixture of divinyl benzene and styrene. They have thickness of about 0.6 millimeter, and aretal resistances of about 15 ohm cm.² in 0.01 normal sodium chloride at room temperature, water contents of about 33 percent of the wet resin only, cation exchange capacities of about 2.5 milliequivalents per dry gram of resin, average pore sizes of less than 0.1 micron, transport numbers for sodium ions of about 0.85 when in equilibrium with 1 normal sodium chloride, Mullen A burst strengths of about 175 pounds per square inch and are reinforced with woven, spun, glass fiber fabric.

A 2 normal solution of sodium sulfate is introduced into the cathode and central compartments of Array 1 at rates of about 4 liters per hour each per active square foot of anode. The current density at the anode and at the cathode is 120 amperes per square foot. The temperature of the array is maintained at about 150° F. by recirculating both the anolyte and the catholyte through heat exchangers. The voltage required is about 6 volts per cell. At steady state the bleed from the anolyte is found to be essentially 1 molar sodium bisulfate indicating a current efficiency of about 90 percent. Gaseous sulfur dioxide is sparged into the recirculating catholyte at a rate to maintain the pH of the effluent catholyte at substantially less than 8 and preferably between about 3 and about 7. About 4 liters of catholyte per hour per square foot are removed from the recirculating cathode stream. The catholyte bleed is contacted countercurrently with the simulated waste gas in a first column packed with glass Raschig rings. The liquid and gas flows and the height of the packing are adjusted to remove about 9 percent of the $NO_2$ and to give a liquid effluent having an empirical composition coresponding to about 90 mol percent sodium bisulfite and about 10 percent sodium hydrosulfite (not including sodium sulfate in the computation). The liquid effluent from this first column is introduced on a batch recycle basis into the central compartments of Array 11. That is the solution passes into the central compartments through the diaphragms and out of the anode compartments into a batch recycle holding tank. A 2 normal solution of sodium sulfate is recirculated through the cathode compartments on a batch recycle basis. The temperature of the array is maintained at about 150° F. by recirculating both the anolyte and catholyte through heat exchangers. The potential drop at the anodes (which are in electrical parallel) is continuously measured and adjusted to be intermediate between the potential required to oxidize bisulfite to sulfate (about +0.08 volt versus the standard hydrogen electrode) and that required to oxidize dithionite to sulfurous acid (about —0.17 volt versus the standard hydrogen electrode). It will be understood that the optimum controlled potential is a function of the temperature, the concentration of dithionite and bisulfite and the pH of the solution. It is best determined during the course of an electrolysis by continuously monitoring the recycle anolyte with a rotating platinum microelectrode polarograph (voltameter, potential sweep). The controlled anodic potential should be chosen to be at least several millivolts below the bisulfite ramp and preferably well into the dithionite plateau. The pH of the recirculating anolyte should be maintained at less than about 5 if necessary adding anolyte effluent from Array 1. The controlled potential electrolysis is preferably continued until at least 90 percent of the hydrosulfite has been oxidized. Gaseous sulfur dioxide is sparged into the recirculating catholyte at a rate to maintain the pH of the effluent catholyte at substantially less than 8 and preferably between about 3 and about 7. The batch size of the catholyte is chosen to be about 1 liter for evary equivalent of hydrosulfite in the anolyte batch. At the end of the cycle, the catholyte effluent is added to the catholyte effluent from Array 1. During the electrolysis some sulfur dioxide will be released by the anolyte and should be collected and fed to the catholyte of Array 1 and/or 11. The anolyte from Array 11 at the end of the cycle is mixed with the corresponding amount of anolyte from Array 1 and passed downwardly through a second column packed with glass Raschig rings and heated to 100° C. and against an upward stream of steam from a reboiler. The overhead vapor from the column is condensed against cold water and the condensate returned to the second column as reflux. The vapor leaving the condenser is collected without drying and used as the gaseous feed to the catholytes of Arrays 1 and 11. The sodium sulfate leaving the bottom of the second column is diluted to about 2 equivalents of sodium per liter. At steady state it is found that there is a surplus of sodium bisulfate of about 0.03 to about 0.06 equivalent per liter depending upon the efficiency of oxidizing hydrosulfite in Array 11 and the presence of transition metal impurities in the sorbent of the first column. The excess bisulfate may be neutralized with sodium carbonate or bicarbonate as in Example 3 with lime as in Example 3 or by crystallization as in Example 4.

This example illustrates the use of the cycle process to remove nitrogen oxides (which are capable of oxidizing bisulfite) without substantial oxidation of bisulfite and without substantial production of waste products.

The embodiment of the invention in which an exclusive property or privilege is claimed is defined as follows:

1. A process for the removal of nitrogen oxides capable of oxidizing bisulfite from a gaseous mixture containing the same which process comprises the steps of:

(a) introducing an aqueous feed solution of a sulfate salt selected from the group consisting of sodium, potassium, ammonium and magnesium sulfate into at least the center compartment of a three compartment electrolytic cell wherein the center compartment is disposed between a cathode containing compartment and an anode containing compartment, said center compartment separated from the adjacent anode compartment by a liquid permeable microporous diaphragm and from the adjacent cathode compartment by an ion permeable barrier, maintaining sufficient pressure in said center compartment to cause said feed solution to pass through said microporous diaphragm into the adjacent anode compartment, introducing an aqueous electrolytically conducting available sulfur dioxide bearing feed liquid into said cathode compartment, passing a direct electric current across the electrodes transversely through said compartments to produce a reducing solution at said cathode comprising a reduction product of bisulfite and an acid solution at said anode;

(b) contacting the effluent reducing solution from said cathode compartment with said gaseous mixture to react with at least part of said nitrogen oxide whereby said reaction substantially results in the formation of bisulfite salt and a reduction product of said nitrogen oxide;

(c) combining at least part of said bisulfite salt with substantially the stoichiometric amount of the said acidic solution produced at said anode whereby the reaction results in reforming a solution of sulfate salt accompanied by the desorption of sulfur dioxide;

(d) passing said reformed sulfate salt back as feed solution to at least the center compartment or said electrolytic cell after first substantially stripping off and collecting the desorbed sulfur dioxide and (e) passing an aqueous electrolytically conducting available sulfur dioxide bearing liquid back as feed solution to said cathode compartment, said liquid comprising solutes selected from the group consisting of said bisulfite salt, said sulfur dioxide, said sulfate salt and mixtures thereof thereby completing the cyclic process.

2. The process according to claim 1 characterized in that the said sulfate salt comprises sodium sulfate, the bisulfite salt comprises predominately sodium bisulfite and the reducing solution comprises solutes selected from the group consisting of sodium thiosulfate, sodium dithionite, electrolytic reduction product of sodium bisulfite and mixtures thereof.

3. The process according to claim 1 characterized in that a portion of said predominately bisulfite salt solution is introduced into the cathode compartment of at least one of said three compartment electrolytic cells whereby a reduction product of said bisulfite salt is produced which product is more susceptible to oxidation by nitrogen oxides than said bisulfite salt.

4. The process according to claim 1 characterized in that the feed liquid introduced into said cathode compartment comprises sodium sulfate and sulfur dioxide.

5. The process according to claim 1 characterized in that the effluent solution from said cathode compartment is maintained at a pH between about 3 and 7.

6. The process of claim 1 wherein the ion-permeable barrier is a cation permselective membrane.

7. A process for the removal of nitrogen oxides capable of oxidizing bisulfite from a gaseous mixture containing the same which process comprises the steps of:

(a) introducing an aqueous feed solution of a sulfate salt selected from the group consisting of sodium, potassium, ammonium and magnesium sulfate into at least the center compartment of a three compartment electrolytic cell wherein the center compartment is disposed between a cathode containing compartment and an anode containing compartment, said center compartment separated from the adjacent anode compartment by a liquid permeable microporous diaphragm and from the adjacent cathode compartment by an ion-permeable barrier, maintaining sufficient pressure in said center compartment to cause the feed solution to pass through said microporous diaphragm into the adjacent anode compartment, introducing an aqueous electrolytically conducting available sulfur dioxide bearing feed liquid into said cathode compartment, passing a direct electric current across the electrodes transversely through said compartments to produce a reducing solution at said cathode comprising a reaction product of bisulfite and acid solution at said anode;

(b) reacting the nitrogen oxides of said gaseous mixture with said reducing catholyte solution to form a solution of substantially bisulfite salt;

(c) combining at least a portion of said anolyte effluent solution with substantially the stoichiometric amount of the said bisulfite salt solution whereby the reaction results in reforming a solution of sulfate salt accompanied by desorption of sulfur dioxide, said sulfur dioxide being stripped off and recovered as a relatively concentrated stream;

(d) subjecting a minor portion of said anolyte effluent solution to alternate evaporation and chilling to crystallize and recover sulfate salt from a mother liquor of sulfuric acid, said recovered sulfate salt being redissolved and reused as part of said sulfate feed solution to said cell;

(e) withdrawing said sulfuric acid mother liquor from the overall scrubber system;

(f) passing said reformed sulfate salt back as feed solution to at least the center compartment of said electrolytic cell after first substantially stripping off and collecting the desorbed sulfur dioxide;

(g) passing an aqueous electrolytically conducting available sulfur dioxide bearing liquid back as feed solution to said cathode compartment, said liquid comprising solutes selected from the group consisting of said bisulfite salt, said sulfur dioxide, said sulfate salt and mixtures thereof thereby completing the cyclic process.

8. The process of claim 7 wherein the ion-permeable barrier is a cation permselective membrane.

9. A process for maintaing pH control in a cyclic scrubber system for the removal of a nitrogen oxide capable of oxidizing bisulfite from a gaseous mixture containing the same comprising the steps of:

(a) introducing an aqueous feed solution of a sulfate salt selected from the group consisting of sodium, potassium, ammonium and magnesium sulfate into at least the center compartment of a three compartment electrolytic cell wherein the center compartment is disposed between a cathode containing compartment and an anode containing compartment, said center compartment separated from the adjacent anode compartment by a liquid permeable microporous diaphragm and from the adjacent cathode compartment by an ion-permeable barrier, maintaining sufficient pressure in said center compartment to cause the feed solution to pass through said microporous diaphragm into the adjacent anode compartment, introducing an electrolytically conducting available sulfur dioxide bearing aqueous feed liquid into said cathode compartment, passing a direct electric current across the electrodes transversely through said compartments to produce a reducing solution comprising a reaction product or bisulfite at said cathode and an acid solution at said anode;

(b) absorbing the nitrogen oxide of said gas mixture into said reducing catholyte product and reacting it therewith substantially to form a solution of bisulfite salt;

(c) combining at least a portion of said anolyte effluent solution with said bisulfite salt solution whereby the reaction results in forming of an acidic solution of sulfate salt accompanied by desorption of sulfur dioxide, said sulfur dioxide being stripped off and recovered as a relatively concentrated stream;

(d) adding lime to a portion of said reformed sulfate salt solution to effect the substantial precipitation of the sulfate contained therein as relatively insoluble calcium sulfate;

(e) and clarifying said lined sulfate solution before passing the same back as a feed solution to the electrolytic cell thereby completing the cyclic process;

(f) passing said reformed sulfate salt back as feed solution to at least the center compartment of said electrolytic cell after first substantially stripping off and collecting the desorbed sulfur dioxide;

(g) passing an electrolytically conducting available sulfur dioxide bearing liquid back as feed solution to said cathode compartment, said liquid comprising solutes selected from the group consisting of at least part of said bisulfite salt, at least part of said sulfur dioxide and at least part of said sulfate salt thereby completing the cyclic process.

10. The process according to claim 9 characterized in that soda ash is added to the limed solution after clarification whereby additional calcium salts are precipitated out of solution primarily in the form of calcium carbonate.

References Cited

UNITED STATES PATENTS

| 3,523,755 | 8/1970 | McRae | 204—92 |
| 3,475,122 | 10/1969 | McRae et al. | 204—98 |

JOHN H. MACK, Primary Examiner

R. L. ANDREWS, Assistant Examiner

U.S. Cl. X.R.

23—2; 204—101, 130